United States Patent
Brunbäck et al.

(10) Patent No.: US 12,059,955 B2
(45) Date of Patent: Aug. 13, 2024

(54) VEHICLE OCCUPANT MANAGEMENT SYSTEM AND METHOD

(71) Applicant: Ningbo Geely Automobile Research & Development Co., Ltd., Ningbo (CN)

(72) Inventors: Robert Brunbäck, Lerum (SE); Silvia Arnell, Mölndal (SE); William Andersson, Vimmerby (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 839 days.

(21) Appl. No.: 17/074,190

(22) Filed: Oct. 19, 2020

(65) Prior Publication Data

US 2021/0031630 A1    Feb. 4, 2021

Related U.S. Application Data

(63) Continuation of application No. PCT/CN2019/082831, filed on Apr. 16, 2019.

(30) Foreign Application Priority Data

Apr. 25, 2018 (EP) .................................. 18169378

(51) Int. Cl.
*B60K 35/00* (2024.01)
*B60K 35/10* (2024.01)
(Continued)

(52) U.S. Cl.
CPC ............. *B60K 35/00* (2013.01); *B60W 40/08* (2013.01); *G06V 20/59* (2022.01); *B60K 35/10* (2024.01);
(Continued)

(58) Field of Classification Search
CPC ............. B60K 35/00; B60K 2370/741; B60K 2370/148; B60K 2370/164;
(Continued)

(56) References Cited

U.S. PATENT DOCUMENTS 9,014,546 B2 * 4/2015 Shimy .............. H04N 21/42201
386/296
9,183,560 B2 * 11/2015 Abelow ............. G06Q 30/0601
(Continued)

FOREIGN PATENT DOCUMENTS

CN          105774709 A       7/2016

OTHER PUBLICATIONS

International Search Report and Written Opinion from corresponding International Application No. PCT/ CN2019/082831, mailed on Jul. 15, 2019, 8 pages.
(Continued)

*Primary Examiner* — Luis A Martinez Borrero
(74) *Attorney, Agent, or Firm* — Tucker Ellis LLP (57) ABSTRACT

A method and a vehicle occupant management system enhances the traveling experience depending on the occupants in a vehicle. The system includes a sensor configured to detect at least a first occupant in a vehicle; a memory configured to manage data and a processing circuitry. The a processing circuitry is configured to cause the vehicle occupant management system to detect by the sensor, at least a first occupant in the vehicle; identify the at least first occupant using identification data of the at least first occupant; associate the at least first occupant with an unique identity and storing the association in the memory; identify a data session in the vehicle; and associate the data session with the unique identity of the at least first occupant.

10 Claims, 3 Drawing Sheets

(51) Int. Cl.
  *B60K 35/28* (2024.01)
  *B60K 35/65* (2024.01)
  *B60W 40/08* (2012.01)
  *G06V 20/59* (2022.01)

(52) U.S. Cl.
  CPC .............. *B60K 35/28* (2024.01); *B60K 35/65* (2024.01); *B60K 2360/148* (2024.01); *B60K 2360/164* (2024.01); *B60K 2360/741* (2024.01); *B60W 2540/043* (2020.02)

(58) Field of Classification Search
  CPC ........ B60K 2360/741; B60K 2360/148; B60K 2360/164; B60K 35/65; B60K 35/28; B60K 35/10; G06V 20/59; B60W 40/08; B60W 2540/043
  See application file for complete search history.

(56) References Cited

U.S. PATENT DOCUMENTS

| | | | |
|---|---|---|---|
| 9,530,414 B2 | 12/2016 | Zhao et al. | |
| 9,743,213 B2 | 8/2017 | Mohammad et al. | |
| 10,446,018 B1* | 10/2019 | Han | B60K 35/00 |
| 10,796,176 B2* | 10/2020 | el Kaliouby | G06F 18/2414 |
| 11,222,298 B2* | 1/2022 | Abelow | G06Q 10/067 |
| 11,465,631 B2* | 10/2022 | Williams | B60H 1/00742 |
| 2003/0222767 A1 | 12/2003 | Patterson et al. | |
| 2013/0314536 A1* | 11/2013 | Frank | B60H 1/00742 |
| | | | 348/148 |
| 2014/0093133 A1* | 4/2014 | Frank | B60R 21/015 |
| | | | 382/104 |
| 2014/0309806 A1* | 10/2014 | Ricci | H04W 48/04 |
| | | | 701/1 |
| 2014/0309862 A1* | 10/2014 | Ricci | B60W 50/08 |
| | | | 701/36 |
| 2014/0309866 A1* | 10/2014 | Ricci | G06F 21/32 |
| | | | 701/36 |
| 2014/0310739 A1* | 10/2014 | Ricci | G06F 3/013 |
| | | | 725/75 |
| 2014/0316607 A1 | 10/2014 | Le et al. | |
| 2017/0240066 A1 | 8/2017 | Wang et al. | |
| 2017/0247000 A1 | 8/2017 | Ricci | |
| 2017/0360373 A1 | 12/2017 | Montgomery et al. | |
| 2018/0050575 A1* | 2/2018 | Campbell | G01S 7/52006 |
| 2018/0088661 A1* | 3/2018 | Betancourt | G01C 21/3667 |
| 2018/0144369 A1* | 5/2018 | Pouliot | B60W 30/0953 |
| 2019/0073547 A1* | 3/2019 | el Kaliouby | G06N 3/084 |
| 2020/0273268 A1* | 8/2020 | Bhattacharyya | |
| | | | G06Q 10/06315 |
| 2021/0105619 A1* | 4/2021 | Kashani | G10L 15/25 |
| 2021/0179117 A1* | 6/2021 | Glazman | B60H 1/00357 |
| 2021/0232642 A1* | 7/2021 | Ricci | A61B 5/0077 |
| 2022/0224963 A1* | 7/2022 | Herz | H04N 21/41422 |
| 2023/0030426 A1* | 2/2023 | Glazman | B60R 21/015 |

OTHER PUBLICATIONS

International Preliminary Report on Patentability from corresponding International Application No. PCT/CN2019/082831, completed on Aug. 4, 2020, 15 pages.

* cited by examiner

VEHICLE OCCUPANT MANAGEMENT SYSTEM AND METHOD

RELATED APPLICATION DATA

This application is a continuation of International Patent Application No. PCT/CN2019/082831, filed Apr. 16, 2019, which claims the benefit of European Patent Application No. 18169378.9, filed Apr. 25, 2018, the disclosures of which are incorporated herein by reference in their entireties.

TECHNICAL FIELD

The disclosure pertains to the field of identifying occupants in a vehicle for enhancing the traveling experience for the occupants.

BACKGROUND

Vehicles are used every day for transporting persons. It is common that plural persons are traveling together in one vehicle. Examples when plural persons are traveling together is for instance when plural family members are traveling together, or a group of friends or colleagues, or couples are traveling together in one vehicle. Different persons may travel together at different times. A vehicle may have different occupants, e.g. different drivers and/or different passengers.

Vehicle occupants may have different preferences for enhancing the experience when traveling in the vehicle. The occupants may be interacting or be involved in different activities when traveling alone or together in the vehicle. Occupants may for example consume certain multimedia, navigate or travel a certain route, operate the climate control according to a desired mode or use a specific vehicle configuration etc.

Today vehicles are, in particular passenger cars, equipped with different kind of personal settings for different drivers of the vehicle. Different drivers can have different settings to enhance the driving experience. Examples of such settings are e.g. favorite radio stations, driver seat settings and settings of the side mirrors etc. Settings can be stored and recalled at a later occasion for a certain driver. A vehicle may have different personal settings for a plural, e.g. three, different drivers, each driver having their own personal settings programmed that can be recalled by e.g. pressing a physical button. Some vehicles have the settings associated with a specific key that is used for unlocking and/or starting the vehicle.

There are a number of aspects that affects the traveling experience for the occupants in the vehicle and there are also a number of activates that the occupants are occupied with when traveling together in the vehicle.

SUMMARY

Today there is a demand for a better way to enhance the traveling experience for occupants in a vehicle. The inventors have identified that vehicles today can identify the occupants by e.g. keys for unlocking and/or starting the vehicle, or by what personal setting button that is pressed. The inventors have realized that in order to enhance the traveling experience for everyone traveling in a vehicle, all occupants, not only the drivers, but also the passengers need to be identified. The inventors have further realized that with the knowledge of what a certain identified occupant is doing, and what is happening in the vehicle when the identified occupant is traveling alone or together with other identified occupants, then the traveling experience next time when the occupant is travelling alone, or together with the same identified occupants, can be enhanced.

The disclosure proposes a method of identifying occupants in a vehicle for enhancing the traveling experience dependent on who the occupants are. The method comprising the step of detecting, by a sensor, at least a first occupant in a vehicle followed by the step of identifying the at least first occupant using identification data of the at least first occupant and then in step of associating the at least first occupant with an unique identity and storing the association in a memory. The method is then identifying a data session in the vehicle and associating the data session with the unique identity of the at least first occupant. In other words, an occupant is detected and identified and then associated with a data session in the vehicle. This means that any ongoing data session in the vehicle can be associated with the at least first occupant.

According to an aspect the method further comprising the step of identifying a first data session in the vehicle when the first occupant is the only identified occupant in the vehicle and the step of associating the first data session with that only the unique identity of the first occupant has been identified. This means that it can be detected when the first occupant is the only identified occupant and the first data session is then hence only associated with the first occupant.

According to an aspect the method further comprising the step of identifying, by a sensor, where the at least first occupant is seated in the vehicle. This means that the at least first occupant is not only identified but it is also known where in the vehicle the at least first occupant is seated.

According to an aspect the method further comprising the step of identifying a second occupant using identification data of the second occupant. In other words a first occupant and a second occupant are detected and identified. The method is then followed by the step of associating the second occupant with a unique identity and storing the association in a memory. Hence both the first occupant and the second occupant are each associated with unique identities. The method is then followed by the step of identifying a second data session in the vehicle and then the step of associating the second data session with the combination of the unique identity of the first occupant and the unique identity of the second occupant. An advantage with this is that the second data session can be associated with the two occupants.

According to an aspect the method further comprising the step of storing the association as association data together with a timestamp in a memory. This means that the two occupants have the second data session in common as a session that has occurred when the two occupants were present in the vehicle at a certain time.

According to an aspect the method further comprising the step of retrieving previously stored association data from the memory based on the unique identity, or combination of unique identities, for determining a previous data session associated with the at least first occupant at an earlier point in time and generating a data session suggestion based on the retrieved previously stored association data. In other words with the knowledge of a previous data session associated with a certain occupant, or certain occupants, a suggested data session can be provided.

According to an aspect the method further comprising the step of outputting the data session suggestion to the at least first occupant via a user interface. This means that the at least first occupant becomes aware of the suggested data session.

According to an aspect the unique identity comprising an existing occupant account with associated identification data of the at least first occupant stored in the memory. In other words the unique identity already exists for the occupant and the existing occupant account can be used when associating the at least first occupant with a known occupant identification data.

According to an aspect the unique identity comprising creating an occupant account and storing the identification data of the at least first occupant in the memory. In other words an occupant account is created and the identification data of the at least first occupant is stored together with the unique identity of the at least first occupant when creating the occupant account.

According to an aspect the data session is any of a data streaming session; a multimedia session; a geographical position navigation session; a game session; a video session; a music session; a podcast session; a guided tour session; a telephone call session; a video call session; a chat session; an internet session; an internet sharing session; a vehicle comfort setting session; a vehicle climate control setting session; a vehicle driving mode setting session or a vehicle configuration setting session. In other words the meaning of data session includes any ongoing activity, setting, mode, preference, status, indication, signal, and output, input that can be identified and stored in the memory.

According to an aspect the identification data of the at least first occupant comprising any of: face recognition data; iris recognition data; voice recognition data; fingerprint data; electronic device identification data; Radio Frequency Identification data; wireless broadcasting data or Near Filed Communication identification data. An advantage is that a plurality of data can be used for identifying the occupant, alone or in combination, to secure the identity of the at least first occupant.

The disclosure further proposes a vehicle occupant management system for enhancing the traveling experience dependent on who the occupants in a vehicle is. The system comprising a sensor configured to detect at least a first occupant in a vehicle, a memory configured to manage data and a processing circuitry. The processing circuitry is configured to cause the vehicle occupant management system to detect, by the sensor, at least a first occupant in the vehicle and identify the at least first occupant using identification data of the at least first occupant. The processing circuitry is further configured to associate the at least first occupant with a unique identity and storing the association in the memory, identify a data session in the vehicle and associate the data session with the unique identity of the at least first occupant. In other words, an occupant is detected and identified and then associated with a data session in the vehicle. This means that any ongoing data session in the vehicle can be associated with the at least first occupant.

According to an aspect the processing circuitry is further configured to cause the vehicle occupant management system to identify a first data session in the vehicle when the first occupant is the only identified occupant in the vehicle and associate the first data session with that only the unique identity of the first occupant has been identified. This means that it can be detected when the first occupant is the only identified occupant and the first data session is then hence only associated with the first occupant.

According to an aspect the processing circuitry is further configured to cause the vehicle occupant management system to identify a second occupant using identification data of the second occupant. In other words a first occupant and a second occupant are detected and identified. According to an aspect the processing circuitry is further configured to cause the vehicle occupant management system to associate the second occupant with an unique identity and store the association in a memory. Hence both the first occupant and the second occupant are each associated with unique identities. According to an aspect the processing circuitry is further configured to cause the vehicle occupant management system to identify a second data session in the vehicle and associate the second data session with the combination of the unique identity of the first occupant and the unique identity of the second occupant. An advantage with this is that the second data session can be associated with the two occupants.

According to an aspect the processing circuitry is further configured to cause the vehicle occupant management system to retrieve previously stored association data from the memory based on the unique identity, or combination of unique identities, for determining a previous data session associated with the at least first occupant at an earlier point in time and generate a data session suggestion based on the retrieved previously stored association data. In other words with the knowledge of a previous data session associated with a certain occupant, or certain occupants, a suggested data session can be provided.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The method and system disclosed herein can, however, be realized in many different forms and should not be construed as being limited to the aspects set forth herein. Like numbers in the drawings refer to like elements throughout. The terminology used herein is for the purpose of describing particular aspects of the disclosure only, and is not intended to limit the disclosure.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today there is a demand for a better way to enhance the traveling experience for occupants in a vehicle. The inventors have identified that vehicles today can identify the occupants by e.g. keys for unlocking and/or starting the vehicle, or by what personal setting button that is pressed. The inventors have realized that in order to enhance the traveling experience for everyone traveling in a vehicle, all occupants, not only the drivers, but also the passengers need to be identified.

The inventors have further realized that with the knowledge of what a certain identified occupant is doing, and what is happening in the vehicle when the identified occupant is traveling alone or together with another identified occupants, then the traveling experience next time when the occupant is travelling alone, or together with the same identified occupants, can be enhanced.

Figure 1:
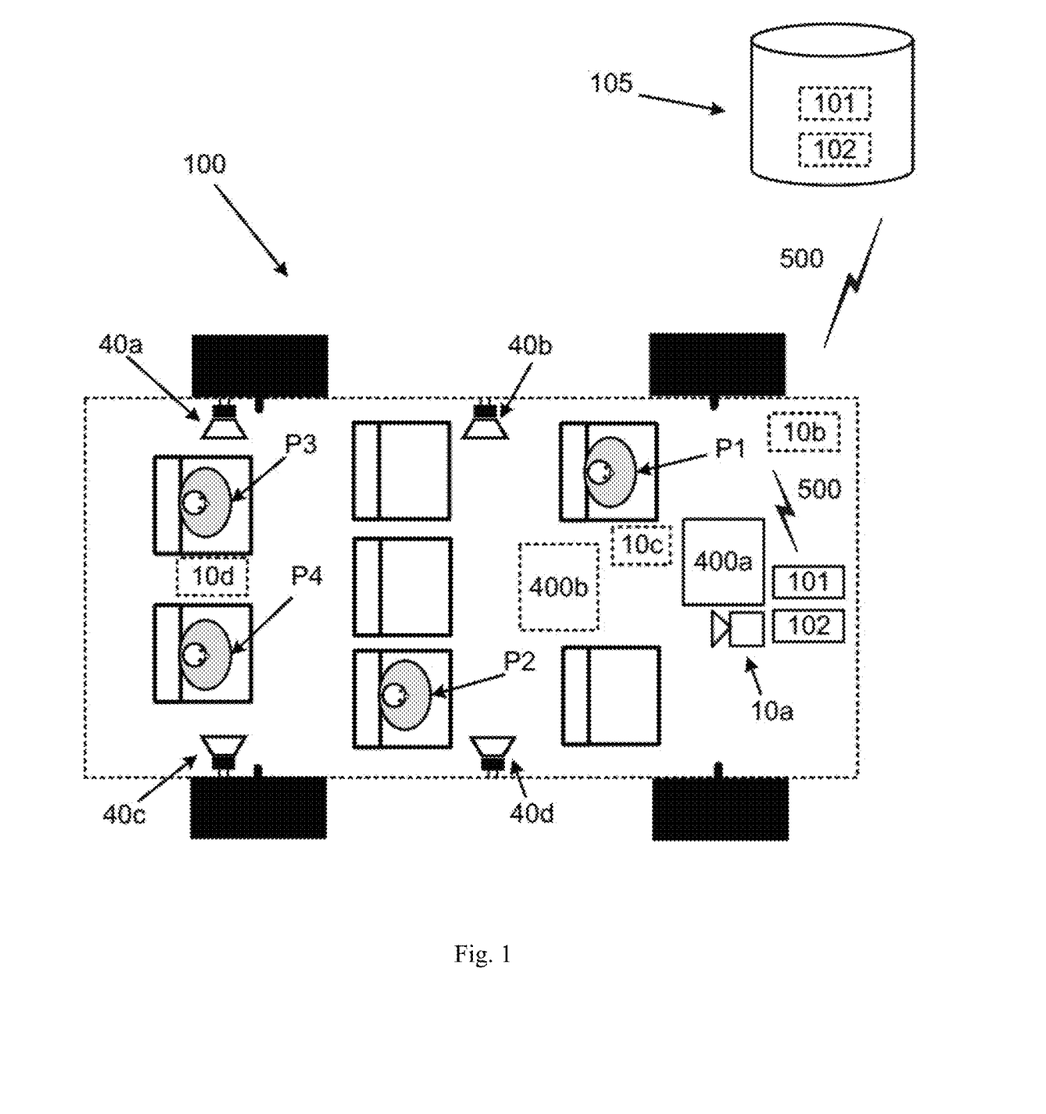
FIG. 1 illustrates an example overview of the proposed vehicle occupant management system.

The disclosure proposes a vehicle occupant management system 100, as illustrated in FIG. 1, for enhancing the traveling experience dependent on who the occupants in a vehicle are. The vehicle can be any vehicle, such as a private vehicle for private use, e.g. a family or a company vehicle. The vehicle can also be vehicle for professional use such as a taxi or transport vehicle with different or recurrent occupants. According to an aspect the vehicle is a passenger car. The vehicle can be a driver less vehicle i.e. with only passengers as occupants. The vehicle can also be a vehicle with plural drivers or operators. An occupant is any person travelling with the vehicle, e.g. a driver and/or a passenger.

The system comprising a sensor 10a, 10b, 10c, 10d configured to detect at least a first occupant in a vehicle. According to an aspect the sensor 10a, 10b, 10c, 10d is any of a camera sensor; a temperature sensor; a movement sensor; a seat sensor; an iris sensor; a voice sensor; a fingerprint sensor; a pressure sensor; a short range radio receiver; a NFC sensor; a RFID sensor or a magnetic field sensor configured to detect at least a first occupant in a vehicle. In the illustration in FIG. 1 the sensor 10a is a camera sensor and the sensor 10b is a short range radio receiver such as a Wireless Local Area Network receiver.

According to an aspect sensor 10a, 10b, 10c, 10d is arranged to communicate wirelessly with the processing circuitry 102 via a communication network 500. In one example the communication network 500 is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network 500 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network 500 can also be a combination of both a local area network and a wide area network. The communication network 500 can also be a wired network. According to an aspect of the disclosure the communication network 500 is defined by common Internet Protocols.

The vehicle occupant management system 100 comprises a memory 101 configured to store information and a processing circuitry 102 as illustrated in FIG. 1. According to an aspect the vehicle occupant management system 100 comprise a memory 101 and processing circuitry 102 that are at a remote location 105 as illustrated in FIG. 1. According to an aspect the remote location is a server 105 that is wirelessly connected to the user interface system 100 via the communication network 500.

The processing circuitry 102 is configured to cause the vehicle occupant management system 100 to detect, by the sensor 10a, 10b, 10c, 10d, at least a first occupant in the vehicle and identify the at least first occupant using identification data of the at least first occupant. According to an aspect a first sensor 10a, 10b, 10c, 10d is used to detect the at least a first occupant in the vehicle and a second sensor 10a, 10b, 10c, 10d is used to identify the at least first occupant. According to an aspect a first sensor 10a, 10b, 10c, 10d is used to both detect and identify the at least first occupant.

The processing circuitry 102 is further configured to associate the at least first occupant with an unique identity and store the association in the memory 101, identify a data session in the vehicle and associate the data session with the unique identity of the at least first occupant. This will be described in more detail below. In other words, an occupant is detected and identified and then associated with a data session in the vehicle. This means that any ongoing data session in the vehicle can be associated with the at least first occupant.

Figure 3:
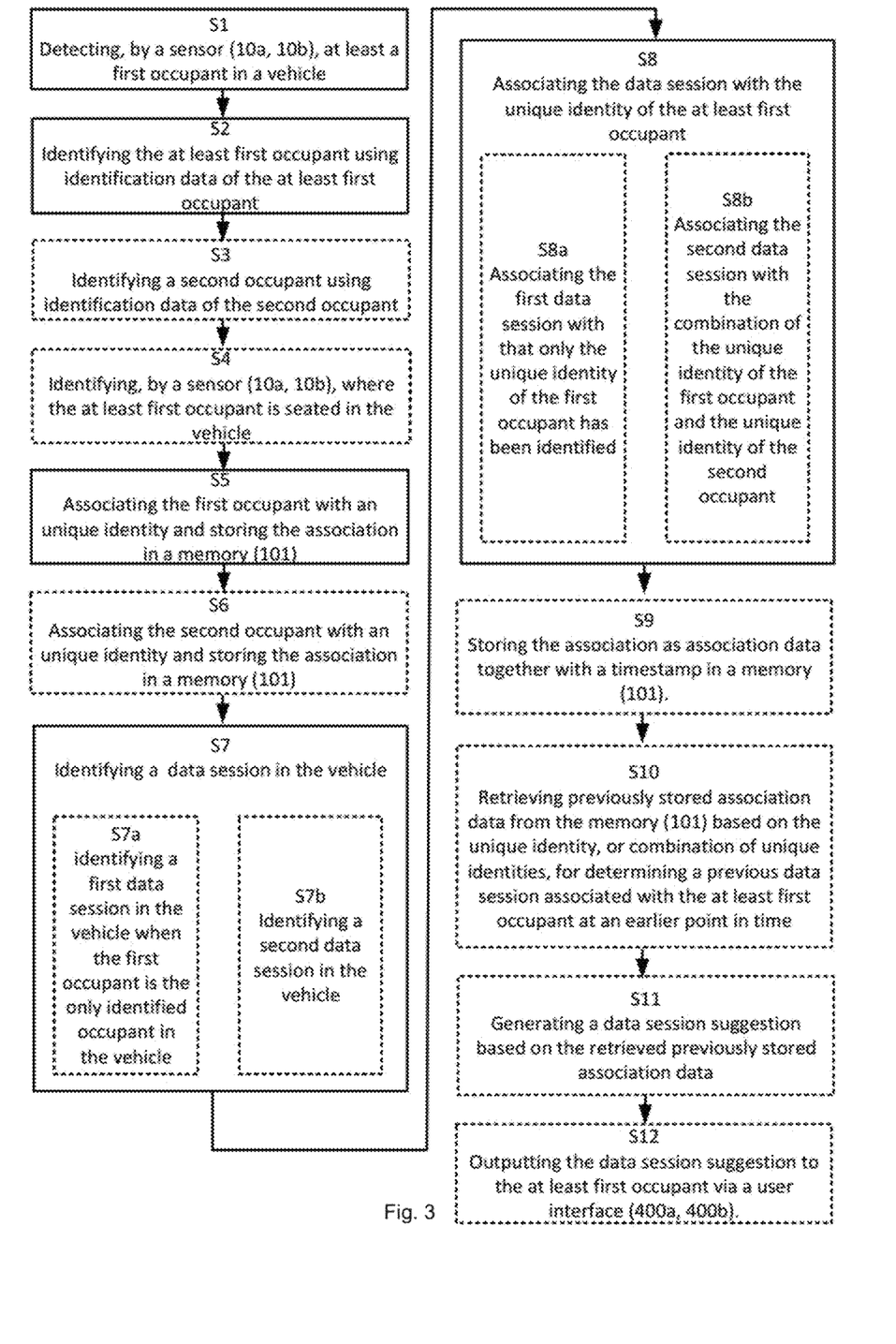
FIG. 3 illustrates a flow chart of the method steps according to an aspect of the disclosure.

The disclosure further proposes a method of identifying occupants in a vehicle for enhancing the traveling experience dependent on who the occupants are. The method is illustrated in FIG. 3. FIG. 3 illustrates a flow chart of the method steps according to an aspect of the disclosure.

The method comprising the step S1 of detecting, by the sensor 10a, 10b, 10c, 10d, at least a first occupant in a vehicle. According to an aspect the detecting comprising detecting the presence of at least a first occupant in the vehicle.

According to an aspect the detecting followed by the step S2 of identifying the at least first occupant using identification data of the at least first occupant. According to an aspect the sensor 10a, 10b, 10c, 10d is a camera sensor. According to an aspect the sensor 10a, 10b, 10c, 10d is used for both detecting and identifying the at least first occupant. According to an aspect the sensor 10a, 10b, 10c, 10d is a short range radio receiver. According to an aspect, the sensor 10a, 10b, 10c, 10d is a short range radio receiver configured to obtain a Media Access Control address, a MAC-address, of a wireless electronic device. According to an aspect, the sensor 10a, 10b, 10c, 10d is a short range radio receiver configured to obtain a service set identifier, SSID, of a wireless electronic device. According to an aspect, illustrated in FIG. 1, the least a first occupant is identified using face recognition data obtained by the camera sensor 10a in combination with a service set identifier, SSID, that is obtained by the short range radio receiver sensor 10b in form of a Wireless Local Area Network receiver.

According to an aspect the identification data of the at least first occupant comprising any of: face recognition data; iris recognition data; voice recognition data; fingerprint data; electronic device identification data; Radio Frequency Identification data; wireless broadcasting data or Near Filed Communication identification data. An advantage is that a plurality of data can be used for identifying the occupant, alone or in combination, to secure the identity of the at least first occupant. According to an aspect at least two sensors 10a, 10b, 10c, 10d are used in combination for identifying the occupant.

As illustrated in FIG. 3, according to an aspect the method further comprising the step S4 of identifying, by a sensor 10a, 10b, 10c, 10d, where the at least first occupant is seated in the vehicle. This means that the at least first occupant is not only detected and identified but it is also known where in the vehicle the at least first occupant is seated. According to an aspect identifying, by a sensor 10a, 10b, 10c, 10d, where the at least first occupant is seated, is determined by any of a camera sensor 10a; a movement sensor, a seat sensor, or a Radio Frequency Identification sensor. According to an aspect, as illustrated in FIG. 1, the location where the at least first occupant is seated in the vehicle is identified by a seat sensor 10c. According to an aspect, as illustrated in FIG. 1, the location where the at least first occupant is seated in the vehicle is identified by a movement sensor 10d. As illustrated in FIG. 1, the movement sensor 10d can be placed and configured to detect movement from any of the seats in the rear row where occupant P3 and P4 are seated in the illustration. According to an aspect at least two sensors 10a, 10b, 10c, 10d, are used for identifying where the at least first occupant is seated in the vehicle.

According to an aspect the location of where the at least first occupant is seated is used for optimizing playback of multimedia. According to an aspect the multimedia is a movie that is played back via a user interface that is a display 400b, as illustrated in FIG. 1. According to an aspect the display 400b is installed in the vehicle to be viewable from a certain seat by the at least first occupant. According to an aspect the multimedia is music that is played back via a loudspeaker 40a, 40b, 40c, 40d of the vehicle. According to an aspect the loudspeaker 40a, 40b, 40c, 40d is installed in the vehicle to optimize the sound at a certain seat for the at least first occupant. In the example illustrated in FIG. 1, the loudspeaker 40d is close to the seat where a second occupant P2 is seated.

According to an aspect, as illustrated in FIG. 3, the method further comprising the step S5 of associating the at least first occupant with an unique identity and storing the association in a memory 101.

According to an aspect the unique identity comprising an existing occupant account with associated identification data of the at least first occupant that is stored in the memory 101. In other words the unique identity already exists for the occupant and the existing occupant account can be used when associating the at least first occupant with a known occupant identification data. In one example the occupant account is a digital account with associated identification data, e.g. a profile of the occupant, which is stored locally in the memory 101 or stored on a remote server 105. The occupant account can be hosted by a third party. The occupant account can be connected to e.g. a social media account, an e-mail account, a vehicle manufacturer account or similar type of personal accounts. According to an aspect the associated identification data comprising least any of occupant face recognition data, occupant name data, occupant voice recognition data, occupant payment details data, occupant account number data, occupant account status data or occupant address information.

According to an aspect the unique identity comprising creating an occupant account and storing the identification data of the at least first occupant in the memory 101. In other words an occupant account is created and the identification data of the at least first occupant is stored together with the unique identity of the at least first occupant when creating the occupant account. In other words, this means that as soon as an occupant account is created, this occupant account can be used for future associations of the at least first occupant. In one example the occupant is prompted to confirm its identity by selecting an already existing occupant account suggested by the vehicle occupant management system 100.

As illustrated in FIG. 3, the method is then followed by the step S7 of identifying a data session in the vehicle and the step S8 of associating the data session with the unique identity of the at least first occupant. According to an aspect the term data session includes any ongoing activity, setting, mode, preference, status, indication, signal, output, input that can be identified in the vehicle and stored in the memory 101. According to an aspect the data session is identified by the onboard computer system of a vehicle. According to an aspect the data session is identified by a remote computer system 105 arranged to communicate wirelessly via the communication network 500 with the vehicle occupant management system 100. According to an aspect the data session is any of a data streaming session; a multimedia session; a geographical position navigation session; a game session; a video session; a music session; a podcast session; a guided tour session; a telephone call session; a video call session; a chat session; an internet session; an internet sharing session; a vehicle comfort setting session; a vehicle climate control setting session; a vehicle driving mode setting session or a vehicle configuration setting session. In other words, an occupant is detected and identified and then associated with a data session in the vehicle. This means that any ongoing data session in the vehicle can be associated with the at least first occupant.

According to an aspect the method further comprising the step S7a of identifying a first data session in the vehicle when the first occupant is the only identified occupant in the vehicle and the step S8a of associating the first data session with that only the unique identity of the first occupant has been identified, illustrated in FIG. 3. This means that it can be detected when the first occupant is the only identified occupant and the first data session is then hence only associated with the first occupant. In other words, it is determined that the first occupant is alone in the vehicle, or together with another occupant that is not identified.

Figure 2A:
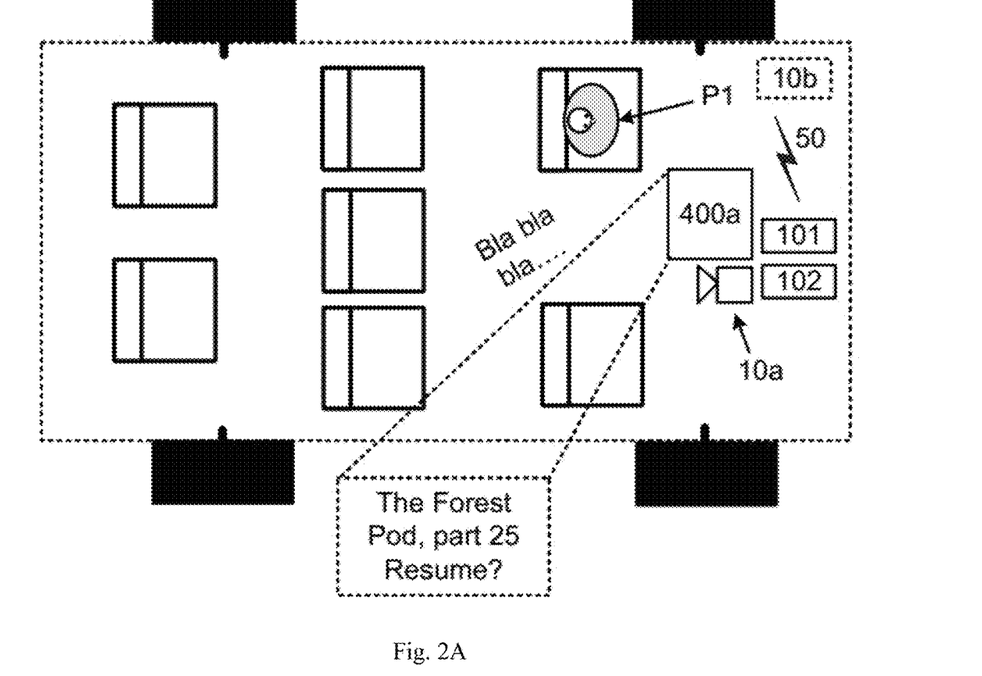
FIG. 2A illustrates an example of the proposed vehicle occupant management system with a first occupant.

FIG. 2A is illustrating a use case when the first occupant P1 is the driver of the vehicle and there is no passenger present. In this illustrative example of FIG. 2A the first occupant P1 is listening to a podcast when the first occupant P1 is the only occupant in the vehicle. According to an aspect the podcast is played back as a podcast session via the entertainment system. The loudspeakers 40a, 40b, 40c, 40d of the vehicle are used for playing back the podcast. In other words the podcast session is detected as the first data session.

Figure 2B:
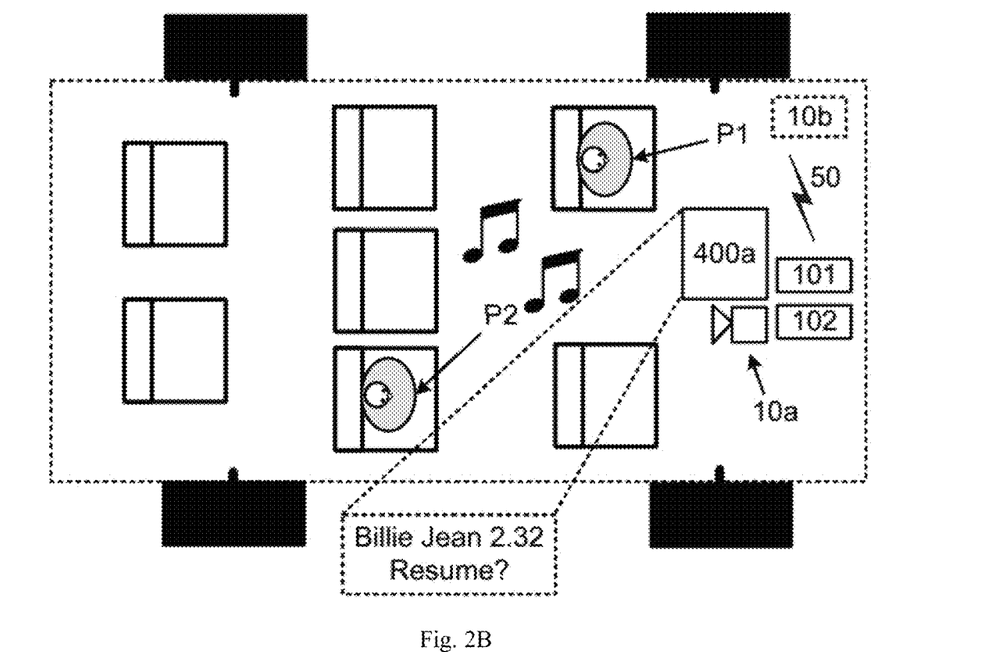
FIG. 2B illustrates an example of the proposed vehicle occupant management system with a first occupant and a second occupant.

According to an aspect the method, illustrated in FIG. 3, further comprising the step S3 of identifying a second occupant using identification data of the second occupant. In other words a first occupant P1 and a second occupant P2 are detected and identified. The method is then followed by the step S6 of associating the second occupant with a unique identity and storing the association in a memory 101. Hence both the first occupant P1 and the second occupant P2 are each associated with unique identities. The method is then followed by the step S7b of identifying a second data session in the vehicle and then the step S8b of associating the second data session with the combination of the unique identity of the first occupant and the unique identity of the second occupant. An advantage with this is that the second data session can be associated with the two occupants. In the illustration of FIG. 2B the first occupant P1 is together with the second occupant P2 in the vehicle. The first occupant P1 and the second occupant P2 are listening to music.

According to an aspect the method further comprising the step S9 of storing the association as association data together with a timestamp in a memory 101. This means that the first occupant P1 and the second occupant P2 have the second data session in common as a session that has occurred when the two occupants were present in the vehicle at a certain time.

According to an aspect the method, illustrated in FIG. 3, further comprising the step S10 of retrieving previously stored association data from the memory 101 based on the unique identity, or combination of unique identities, for determining a previous data session associated with the at least first occupant at an earlier point in time and S11 generating a data session suggestion based on the retrieved previously stored association data. In other words with the knowledge of a previous data session associated with a certain occupant, or certain occupants, a suggested data session can be provided.

According to an aspect the method further comprising the step S12 of outputting the data session suggestion to the at least first occupant via a user interface 400a, 400b. According to an aspect the suggested data session is outputted via a user interface 400a, 400b that is a graphical user interface on a display installed in the vehicle. According to an aspect the user interface 400a, 400b is a user interface of a portable electronic device wirelessly connected to the vehicle occupant management system 100 via the communication network 500. This means that the at least first occupant becomes aware of the suggested data session.

The method will now be described with an example use case illustrated with the FIG. 2A and FIG. 2B. A first occupant P1 is entering the vehicle together with a second occupant P2. The first occupant P1 is detected and identified by the vehicle occupant management system 100 using identification data of the at least first occupant that exists in an occupant account of the first occupant P1. In the example the first occupant P1 has an occupant account provided by the vehicle manufacturer. According to an aspect the occupant account is accessible from a remote server 105 by any vehicle occupant management system 100 provided in any vehicle from the vehicle manufacturer providing the occupant account. In other words, the first occupant P1 can enter any vehicle from the vehicle manufacturer and be identified with help from the identification data of the existing occupant account. This is in particular interest when an occupant is e.g. using a car sharing service.

In the example use case the second occupant P2 does not have an occupant account. After the vehicle occupant management system 100 has identified the second occupant P2, by using the camera sensor 10a, an occupant account is created. In one example the second occupant P2 is prompted to e.g. enter a name, contact details etc. that is stored in the occupant account together with face recognition data for future use.

The first occupant P1 and the second occupant P2 start their journey and start listening to pop music form the 80s, in this example music from the artist Michel Jackson. The first occupant P1 and the second occupant P2 are later separated when the first occupant P1 is dropping off the second occupant P2 at school. The first occupant P1 is now continuing the journey alone.

The vehicle occupant management system 100 then detects and identifies that the first occupant P1 is alone in the vehicle. The vehicle occupant management system 100 is retrieving previously stored association data from the memory 101 based on the unique identity of the first occupant P1 for determining a previous data session associated with the first occupant P1 at an earlier point in time. The vehicle occupant management system 100 is then S11 generating a data session suggestion based on the retrieved previously stored association data. In this example use case previously stored association data from the memory 101 reveals that the first occupant P1 was listening to a podcast last time when the first occupant P1 was the only occupant in the vehicle. The vehicle occupant management system 100 is generating a data session suggestion based on the retrieved previously stored association data. In this example use case the vehicle occupant management system 100 suggests and outputs the data session suggestion to the at least first occupant via a user interface 400a, 400b "The Forest Pod, part 25 Resume?" as illustrated in FIG. 2A. The first occupant can in one example decide to resume the listening to the podcast, rather than listening to the pop music from the 80s, or ignore the suggestion and continue to listen to the pop music.

In the example use case, later the first occupant P1 is picking up the second occupant P2 from school. The vehicle occupant management system 100 then detects and identifies that the first occupant P1 is traveling together with the second occupant P2. The vehicle occupant management system 100 is retrieving previously stored association data from the memory 101 based on the combination of unique identities of the first occupant P1 and the second occupant P2 for determining a previous data session associated with the first occupant P1 and the second occupant P2 at an earlier point in time. The vehicle occupant management system 100 is then S11 generating a data session suggestion based on the retrieved previously stored association data. In this example use case previously stored association data from the memory 101 reveals that the first occupant P1 and the second occupant P2 were listening to Michael Jackson last time when the first occupant P1 and the second occupant P2 were the only two occupants in the vehicle. The vehicle occupant management system 100 is generating a data session suggestion based on the retrieved previously stored association data.

In this example use case the vehicle occupant management system 100 suggests and outputs the data session suggestion to the at least first and the second occupant via a user interface 400a, 400b "Billie Jean 2.32. Resume?" as illustrated in FIG. 2A. The first or second occupant can in one example decide to resume the listening to Michael Jackson rather than listening to the "The Forest Pod", or ignore the suggestion and continue to listen to the podcast.

According to an aspect the data session suggestion based on the retrieved previously stored association data comprising a suggesting a music genre. In the example use case "listen to disco pop music from the 80s" could be a data session suggestion. According to an aspect the data session suggestion based on the retrieved previously stored association data comprising a suggesting a climate control setting. In the example use case, the first occupant P1 and second occupant P2 usually use a cool climate setting when they are travelling together, compare to when only the first occupant P1 is in the vehicle alone. According to an aspect the data session suggestion based on the retrieved previously stored association data comprising a suggesting a destination.

According to an aspect, if further occupants, e.g. a third occupant P3, and a fourth occupant P4 are also detected and identified, as illustrated in FIG. 1, then the vehicle occupant management system 100 is retrieving previously stored association data from the memory 101 based on the combination of unique identities of the first occupant P1, the second occupant P2, the third occupant P3 and the fourth occupant P4 for determining a previous data session associated with the first occupant P1, the second occupant P2, the third occupant P3 and the fourth occupant P4 at an earlier point in time.

The vehicle occupant management system 100 as illustrated in FIG. 1 is configured to carry out the method and the aspects of the method described above. The processing circuitry 102 of the vehicle occupant management system 100 is further configured to associate the at least first occupant with a unique identity and storing the association in the memory 101, identify a data session in the vehicle and associate the data session with the unique identity of the at least first occupant. In other words, an occupant is detected and identified and then associated with a data session in the vehicle. This means that any ongoing data session in the vehicle can be associated with the at least first occupant.

According to an aspect the processing circuitry 102 is further configured to cause the vehicle occupant management system 100 to identify a first data session in the vehicle when the first occupant is the only identified occupant in the vehicle and associate the first data session with that only the unique identity of the first occupant has been identified. This means that it can be detected when the first occupant is the only identified occupant and the first data session is then hence only associated with the first occupant.

According to an aspect the processing circuitry 102 is further configured to cause the vehicle occupant management system 100 to identify a second occupant using identification data of the second occupant. In other words a first occupant and a second occupant is detected and identified. According to an aspect the processing circuitry 102 is further configured to cause the vehicle occupant management system 100 to associate the second occupant with an unique identity and store the association in a memory 101. Hence both the first occupant and the second occupant are each associated with unique identities. According to an aspect the processing circuitry 102 is further configured to cause the vehicle occupant management system 100 to identify a second data session in the vehicle and associate the second data session with the combination of the unique identity of the first occupant and the unique identity of the second occupant. An advantage with this is that the second data session can be associated with the two occupants.

According to an aspect the processing circuitry 102 is further configured to cause the vehicle occupant management system 100 to retrieve previously stored association data from the memory 101 based on the unique identity, or combination of unique identities, for determining a previous data session associated with the at least first occupant at an earlier point in time and generate a data session suggestion based on the retrieved previously stored association data. In other words with the knowledge of a previous data session associated with a certain occupant, or certain occupants, a suggested data session can be provided.

The disclosure further proposes a computer program product comprising a non-transitory computer readable medium, having thereon a computer program comprising program instructions, the computer program being loadable into a processing circuitry 102 and configured to cause execution of the method according to any of claims 1 through 11 when the computer program is run by the processing circuitry 102.

The different aspects of the disclosure can be combined with one or more of the other different aspects. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method of identifying occupants in a vehicle for enhancing a traveling experience dependent on who the occupants are, the method comprising:
   detecting, by a sensor, a first occupant in a vehicle and a second occupant in the vehicle;
   identifying the first occupant using identification data of the first occupant;
   identifying a second occupant using identification data of the second occupant;
   associating the first occupant with an unique identity and storing the association in a memory;
   associating the second occupant with an unique identity and storing the association in a memory;
   detecting and identifying that the first occupant is together with the second occupant in the vehicle;
   identifying a data session in the vehicle, wherein the data session is a unique multimedia session shared between the first occupant and the second occupant while in the vehicle together;
   associating the data session with a combination of the unique identity of the first occupant and the second occupant;
   storing the association as association data together with a timestamp in the memory;
   retrieving previously stored association data from the memory based on the combination of unique identities of the first and the second occupants, for determining a previous data session associated with the unique multimedia session shared between the first occupant and the second occupant at an earlier point in time; and
   generating a data session suggestion based on the retrieved previously stored association data.

2. The method according to claim 1, further comprising:
   identifying a first data session in the vehicle when the first occupant is the only identified occupant in the vehicle; and
   associating the first data session with that only the unique identity of the first occupant has been identified.

3. The method according to claim 1, further comprising:
   identifying, by a sensor, where the first occupant is seated in the vehicle; and
   identifying, by a sensor, where the second occupant is seated in the vehicle.

4. The method according to claim 1, further comprising:
   storing the association as association data together with a timestamp in a memory.

5. The method according to claim 1, further comprising: outputting the data session suggestion to the first occupant via a user interface.

6. The method according to claim 1, wherein the unique identity comprising an existing occupant account with associated identification data of the first occupant stored in the memory.

7. The method according to claim 1, wherein the unique identity comprising creating an occupant account and storing the identification data of the first occupant in the memory.

8. The method according to claim 1, wherein the identification data of the first occupant comprising any of: face recognition data; iris recognition data; voice recognition data; fingerprint data; electronic device identification data; Radio Frequency Identification data; wireless broadcasting data or Near Filed Communication identification data.

9. A vehicle occupant management system for enhancing a traveling experience dependent on who the occupants in a vehicle are, the system comprising:
   a sensor configured to detect a first occupant in a vehicle and a second occupant in the vehicle;
   a memory configured to manage data;
   a processing circuitry configured to cause the vehicle occupant management system to:
      detect by the sensor, a first occupant in the vehicle and a second occupant in the vehicle;
      identify the first occupant using identification data of the first occupant;
      identify the second occupant using identification data of the second occupant
      associate the first occupant with an unique identity and storing the association in the memory;
      associate the second occupant with an unique identity and storing the association in the memory
      detect and identify that the first occupant is together with the second occupant in the vehicle;
      identify a data session in the vehicle, wherein the data session is a unique multimedia session shared between the first occupant and the second occupant while in the vehicle together;
      associate the data session with a combination of the unique identity of the first occupant and the second occupant;
      store the association as association data together with a timestamp in the memory;
      retrieve previously stored association data from the memory based on the combination of unique identities of the first and the second occupants, for determining a previous data session associated with the unique multimedia session shared between the first occupant and the second occupant at an earlier point in time; and
      generate a data session suggestion based on the retrieved previously stored association data.

10. The vehicle occupant management system according to claim 9, wherein the processing circuitry is further configured to cause the vehicle occupant management system to:
   identify a first data session in the vehicle when the first occupant is the only identified occupant in the vehicle; and
   associate the first data session with that only the unique identity of the first occupant has been identified.

* * * * *